Patented Apr. 20, 1926.

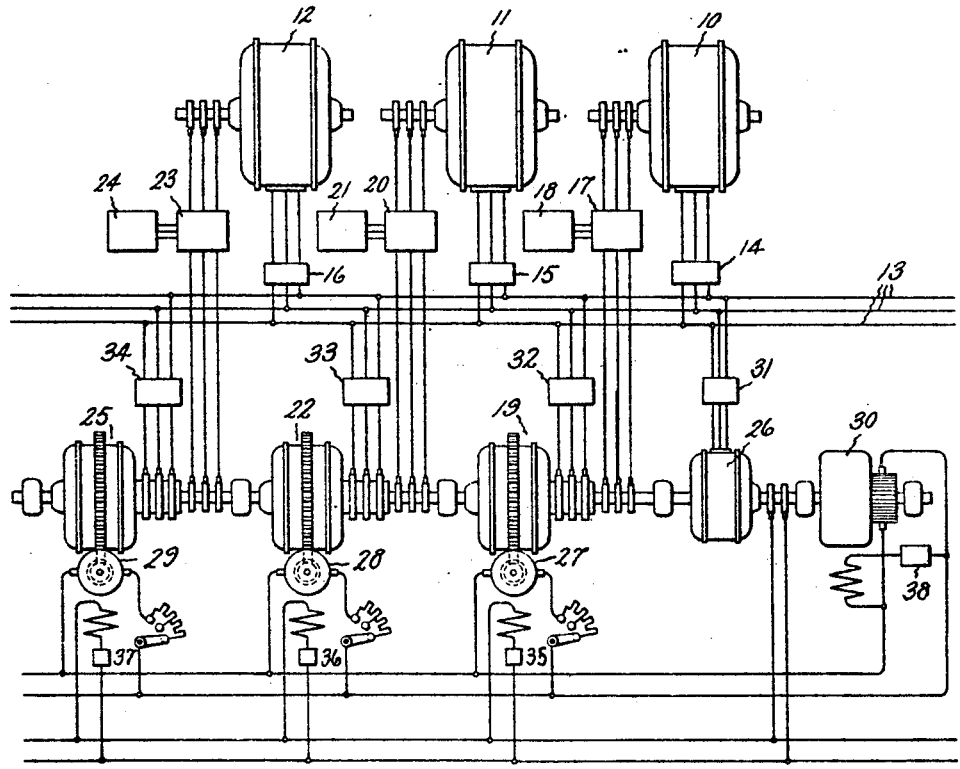

1,581,949

UNITED STATES PATENT OFFICE.

EDWARD H. HORSTKOTTE, OF SCHENECTADY, NEW YORK, ASSIGNOR TO GENERAL ELECTRIC COMPANY, A CORPORATION OF NEW YORK.

SEGREGATED DRIVE FOR PAPER-MAKING MACHINES AND THE LIKE.

Application filed October 9, 1925. Serial No. 61,607.

*To all whom it may concern:*

Be it known that I, EDWARD H. HORSTKOTTE, a citizen of the United States, residing at Schenectady, in the county of Schenectady, State of New York, have invented certain new and useful Improvements in Segregated Drives for Paper-Making Machines and the like, of which the following is a specification.

My invention relates to segregated drives for paper-making machines or the like wherein a plurality of units or sections of the machine must be driven at slightly different speeds, the speed relation thereof must be adjustable and the adjusted speed relation be automatically maintained.

Mills containing paper-making machines are frequently supplied with alternating current power from a transmission system and one of the objects of the invention is to employ alternating current driving motors for the units of the machine, the driving motors receiving power from said source. In employing alternating current driving motors difficulties are encountered in obtaining the required nicety of speed regulation of the motors in order to obtain the desired speed relation of the motors and in automatically preserving the determined speed relation. Therefore, another object of the invention is to provide a simple and effective arrangement whereby the desired speed relation is obtained and automatically maintained.

In carrying the invention into effect in the form which I now regard as the preferred form, I provide a frequency converter for each driving motor, each converter being connected to the secondary of its associated driving motor and the frequency converters being driven by a common driving motor. In order to vary the speed relation of the driving motors, each converter is preferably constructed so that the member carrying the primary windings is rotatable as is also the member carrying the secondary windings, so that by rotating the said members with reference to each other, the frequency of the current in the secondary of the associated motor is varied and thus the speed is varied. A great nicety of speed regulation is thus obtainable and the predetermined speed relation is automatically maintained by reason of the fact that the driving motors are supplied with current from a common source of alternating current and from the fact that the speed relation of the frequency converters is fixed.

For a better understanding of the invention, reference is had to the accompanying drawing wherein I have illustrated an embodiment of the invention in very simplified form. In the drawing, the driving motors 10, 11 and 12 for the units of the paper making machine (not shown) are each arranged to be connected to a separate section or unit of the driven machine. These motors are of the alternating current type, having wound rotors with slip rings as indicated, the primary windings of the motors being arranged to be connected to the three phase alternating current supply circuit 13. The motors 10, 11 and 12 are arranged to be connected to the supply circuit by means of the switch mechanisms 14, 15 and 16 respectively, and the switch mechanism 17 included in the secondary or rotor circuit of the motor 10 is arranged to either connect the rotor circuit of this motor in a local circuit with the starting resistance 18 for the purpose of gradually accelerating the motor up to normal operating speed, or for connecting the rotor circuit of this motor with the secondary winding of an associated frequency converter 19. The switch mechanism 20 performs a similar function in connecting the secondary motor 11 to either starting resistance 21 or in circuit with the secondary of the frequency converter 22 and the switch mechanism 23 performs a similar function in connecting the rotor circuit of the motor 12 with the starting resistance 24, or in a circuit with the secondary winding of the frequency converter 25.

The frequency converters 19, 22 and 25 are alternating current dynamo electric machines of the type in which the member carrying the primary windings is rotatable as well as the member carrying the secondary windings. The members carrying the secondary windings of these converters are mechanically connected, as indicated, so that there will be a fixed speed relation between the converters, and these secondary elements of the converters are arranged to be driven by a common alternating current driving motor 26.

A direct current controlling motor 27 is provided for rotating the member of converter 19, which carries the primary windings so as to vary the frequency of the current in the local circuit including the secondary windings of this frequency converter and of the driving motor 10. The controlling motor 28 for the converter 22 is provided for a similar purpose as is also the controlling motor 29 for the converter 25. I have indicated these controlling motors as of the direct current type supplied with energy from a small generator 30, which is driven by the motor 26, which drives the frequency converters, but I would have it understood that the controlling motors have been shown as of the direct current type because of the fact that a great nicety of speed control is obtained by this type of motors and not that the invention is necessarily limited to this type of motors for operating the members of the converters carrying the primary windings. It will be understood by those skilled in the art that alternating current motors may be provided for this purpose, the motors receiving energy from the supply circuit 13, for example.

As thus constructed and arranged the operation of my invention is as follows:—

Assume that the switches 17, 20 and 23 have been operated so as to include the rotors or secondary windings of the driving motors 10, 11 and 12 in circuit with the starting resistors 18, 21 and 24 respectively, and that the switches 14, 15 and 16 have been closed so as to connect the primary windings of the driving motors to the supply circuit 13. These driving motors will thus be energized to thus drive their respective units of the driven machine and accelerate those units to somewhere near the normal running speed.

It will be assumed that the line switch 31 for the driving motor 26 of the frequency converters is closed so as to drive the secondary winding carrying members of the frequency converters and that the switch 32 between the supply circuit 31 and the primary of the frequency converter 19 is closed, the switch 33 in the primary winding circuit of the frequency converter 22 and the switch 34 in the primary winding circuit of the frequency converter 25 are all closed preparatory to connecting the secondary windings of the driving motors with the secondary windings of the associated frequency converters so as to obtain a speed adjustment of the driving motors.

The speed varying controllers 35, 36 and 37 for the controlling motors 27, 28 and 29, respectively are operated so as to cause their respective primary winding carrying members of their associated frequency converters to operate at such a speed that the frequencies of the currents in the secondary windings of the frequency converters will correspond with the frequency of the currents in the secondary windings of the driving motors. The switch mechanism 17 will then be operated to disconnect the starting resistance 18 and connect the secondary of the driving motor 10 with the secondary of the frequency converter 19, and the switches will be operated for similar purposes.

In order to obtain an adjustment of the speed relation of the driving motors, the controlling motors 27, 28 and 29 will be governed by their respective controllers 35, 36 and 37 to rotate the primary winding carrying members of their associated frequency converters so as to vary the frequency of the current in the secondary winding circuits of the driving motors and the frequency converters and thus vary the speeds of the driving motors. The speed of the driven machine may be either increased or decreased by varying the voltage of the generator 30, as for instance, by varying the field rheostat 38, and it will be observed that the predetermined speed relation of the motors will be automatically preserved because of the fact that the primary windings of the driving motors are connected to the alternating current supply circuit and the primary windings of the frequency converters are connected to the same supply circuit, and from the further fact that the speed relation between the frequency converters is fixed.

One of the important advantages of my invention is that the driving motors may be located at the most convenient places with respect to the paper making machine or other driven machine and the frequency converters may be located at a distance. This is advantageous because of the fact that space is ordinarily at a premium in buildings, housing paper machines or the like, and particularly space between the end of the paper-making machine and the walls of the building. This is particularly the case where an enlarged and improved paper-making machine is provided for taking the place of an old paper-making machine, and there is very little space in the building left for the driving and controlling equipment for the machine. With my invention, since the frequency converters may be placed at any convenient place within the building, a great advantage is thus secured. Furthermore, the determined speed relation of the driving motors will be maintained practically as if the driving motors were positively connected with each other, as for instance, by mechanical connections. The speed relation may be adjusted to a very great nicety because of the comparatively great gear reduction between the controlling motors 27, 28 and 29 and their associated frequency converters.

What I claim as new and desire to secure by Letters Patent of the United States is:—

1. In a segregated drive for a paper machine or the like, a separate slip ring type alternating current motor for driving each of separate units of the machine, a common source of alternating current for the primary windings of said motors, a plurality of frequency converters having rotating elements driven with a fixed speed relation between the said elements, each of said converters being interposed between the said source of supply and the secondary windings of an associated driving motor, and means for adjusting the relation of the frequency conversion effected by said converters.

2. In a segregated drive for a paper machine or the like, a separate alternating current motor of the slip ring wound rotor type for driving each of separate sections of the machine, a common source of alternating current for the stators of said motors, and means for establishing and automatically maintaining a predetermined speed relation between said motors comprising a separate frequency converter for each of said driving motors for supplying to the rotor of each driving motor a variable frequency current to thereby determine the speed of the driving motors, and connections between said converters for preserving a predetermined relation between the frequencies of the currents supplied by said converters.

3. In a segregated drive for a paper-making machine or the like, a separate slip ring type alternating current motor having a primary winding and a secondary winding for driving each of separate sections of the machine, a common source of alternating current for the primary windings of said motors, a frequency converter for each of said motors, each of said converters having a primary winding connected to the source of alternating current and a secondary winding connected to the secondary winding of the associated driving motor, a common driving means for said converters, and means for independently adjusting the frequency of the secondary winding current of each of said motors and converters to thereby adjust the speed relation of the driving motors to be automatically maintained by reasons of the connection of the primary windings of the driving motors with said source of supply and the common drive for said converters.

4. In a segregated drive for a paper-making machine or the like, a separate slip ring wound rotor type alternating current driving motor for each of the sections of the machine, a common alternating current source of supply for the primary windings of said motors, an alternating current frequency converter for each of said motors, each of said converters having rotatable primary and secondary members, each of said members having windings, the windings of each primary member being connected to said source of supply and the windings of each of said secondary members being connected to the slip rings of an associated driving motor, a common driving means for corresponding members of said converters, and means for driving and adjusting the speeds of the other members of said converters to adjust the speed relation of said driving motors to be automatically maintained.

In witness whereof, I have hereunto set my hand this 8th day of October 1925.

EDWARD H. HORSTKOTTE.